J. McCAFFREY, Jr.
STOP-MOTION FORK FOR LOOMS.

No. 170,007. Patented Nov. 16, 1875.

Witnesses:
M. H. Ames.
P. W. Lyall.

Inventor:
John McCaffrey Jr.
Per Chas. D. Moore,
Atty

UNITED STATES PATENT OFFICE.

JOHN McCAFFREY, JR., OF LAWRENCE, MASSACHUSETTS, ASSIGNOR OF ONE-THIRD HIS RIGHT TO SAMUEL M. STEADMAN, OF SAME PLACE.

IMPROVEMENT IN STOP-MOTION FORKS FOR LOOMS.

Specification forming part of Letters Patent No. 170,007, dated November 16, 1875; application filed August 30, 1875.

*To all whom it may concern:*

Be it known that I, JOHN MCCAFFREY, Jr., of Lawrence, in the county of Essex and Commonwealth of Massachusetts, have invented a Stop-Motion Fork for Looms, of which the following is a specification:

The object of my invention is to furnish a stop-motion fork which shall be easy and simple in its construction, and durable and effective, for the purpose herein described and set forth, reference being had to the accompanying drawings for a more accurate description of my said invention, like letters representing the same parts in each of the drawings, of which—

A is a thimble or bearing, having a perforated boss or seat on its top, and designed to hold in place the wires B, B, and D, which pass through the perforations E, E, and E', and at the same time act as an arbor-seat; B, a continuous wire, passing through the outer perforations E E, being formed into a hook at F, and two crooked tines, G G; C, a box or arbor seat, designed to form a support for the fork, and allow the same to be pivoted at this point; D, a continuous wire, forming a third tine, and passed through the perforation E', and secured to and between B B by being brazed or soldered to the same between the points *a b*, and having its outer end formed into a tine, G', to conform with tines G G;

E E E', perforations through the boss on the cylinder A; F, a hook formed by the wire B B, and designed to engage with the shipping mechanism when the filling breaks, or from any cause is not passed before the tines G G G'.

I do not confine myself to the use of any set number of tines.

Figure 1:
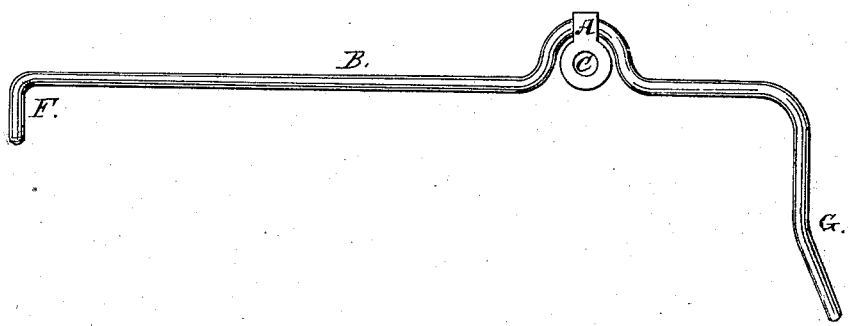
Figure 2:
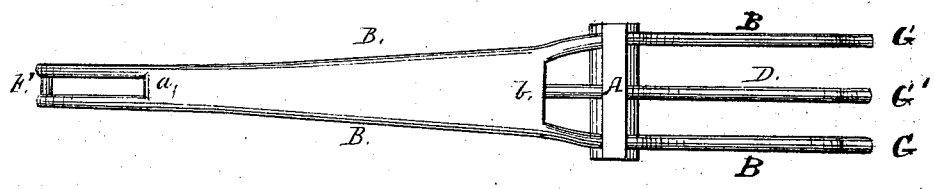
Figure 3:
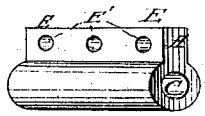

The wires B, B, and D, after being passed through holes E E E' and properly placed, are each formed or set down over the cylinder A, as seen in Fig. 1 of the drawings, to prevent the tines from moving either backward or forward in their sockets E E E'.

I am aware that it is not new to form stop-motion forks of wire, using a coil to form its arbor-seat, or to use a metal arbor-seat and drill and solder the tines thereto, and I make no claim thereto; but

I claim as my invention—

The combination of the continuous wire B B and the wire D, having their points of contact with the thimble bent or shaped to conform thereto, with the thimble or arbor-seat A, substantially as and for the purpose herein described and set forth.

JOHN McCAFFREY, JR. [L. S.]

Witnesses:
GEO. GALEN ABBOTT,
CHAS. D. MOORE.